US012434480B2

(12) United States Patent
Nojo et al.

(10) Patent No.: US 12,434,480 B2
(45) Date of Patent: Oct. 7, 2025

(54) LIQUID CONTAINER AND PRINTING APPARATUS

(71) Applicant: CANON KABUSHIKI KAISHA, Tokyo (JP)

(72) Inventors: Naruyuki Nojo, Kanagawa (JP); Junichiro Iri, Kanagawa (JP); Makoto Watanabe, Kanagawa (JP); Satoru Takahashi, Kanagawa (JP); Isao Otani, Kanagawa (JP); Hiroaki Kusano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 18/324,095

(22) Filed: May 25, 2023

(65) Prior Publication Data

US 2024/0017551 A1 Jan. 18, 2024

(30) Foreign Application Priority Data

Jun. 1, 2022 (JP) ................................ 2022-089493
Feb. 17, 2023 (JP) ................................ 2023-023088

(51) Int. Cl.
*B41J 2/175* (2006.01)

(52) U.S. Cl.
CPC ......... *B41J 2/17513* (2013.01); *B41J 2/1752* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 2/17596; B41J 29/13
See application file for complete search history.

(56) References Cited

U.S. PATENT DOCUMENTS 5,221,935 A 6/1993 Uzita
6,540,342 B2 4/2003 Koshikawa et al.
2006/0290753 A1* 12/2006 Tatsumi ............... B41J 2/17513 347/85
2016/0332451 A1* 11/2016 Miyashita ............ B41J 2/17523
(Continued)

FOREIGN PATENT DOCUMENTS

JP H05-4349 1/1993
JP 2002-178544 6/2002

OTHER PUBLICATIONS

U.S. Appl. No. 18/319,427, filed May 17, 2023.
U.S. Appl. No. 18/296,692, filed Apr. 6, 2023.
U.S. Appl. No. 18/353,828, filed Jul. 17, 2023.

*Primary Examiner* — Anh T Vo
(74) *Attorney, Agent, or Firm* — Venable LLP

(57) ABSTRACT

Provided is a liquid container attachable to a printing apparatus and configured to contain a liquid to be supplied to the printing apparatus, including: a container chamber configured to contain the liquid; a supply unit provided on a tip end side in a direction of attachment to be attached to the printing apparatus and configured to connect the container chamber to the printing apparatus; and a liquid holding unit provided to an inner peripheral surface of the supply unit and capable of holding the liquid by using a capillary force, the liquid leaking out in a case of attaching and detaching the liquid container to and from the printing apparatus, in which a length of the liquid holding unit in the direction of attachment of the liquid container is larger than a length of the liquid holding unit in a direction intersecting with the direction of attachment.

19 Claims, 15 Drawing Sheets

(56) References Cited

U.S. PATENT DOCUMENTS

| | | | |
|---|---|---|---|
| 2021/0370682 | A1 | 12/2021 | Murakami et al. |
| 2022/0363066 | A1 | 11/2022 | Ojima et al. |
| 2022/0396089 | A1 | 12/2022 | Okuyama et al. |

* cited by examiner

LIQUID CONTAINER AND PRINTING APPARATUS

BACKGROUND OF THE INVENTION

Field of the Invention

The techniques according to the present disclosure relate to a liquid container and a printing apparatus.

Description of the Related Art

Japanese Patent Laid-Open No. H05-4349 discloses an ink cartridge, which includes a waste ink absorber (also referred to as a "liquid holding member") to absorb ink that leaks out in the course of detachment from an ink jet printing apparatus (also referred to as a "printing apparatus"). According to Japanese Patent Laid-Open No. H05-4349, the waste ink absorber is disposed throughout a lower side (a gravitational direction side) of an ink bag provided to the ink cartridge (also referred to as a "liquid container").

Japanese Patent Laid-Open No. 2002-178544 discloses an ink absorbing member located inside a supply port unit provided to a liquid container and configured to extend in an anti-gravitational direction and a gravitational direction from the supply port unit and to absorb an ink remaining inside the supply port unit by using a capillary force in a case of attaching and detaching the liquid container to and from a printing apparatus.

Even though there may be a case of a leakage of a liquid in the course of attaching and detaching a non-refillable liquid container to and from a printing apparatus, there is a limitation in the amount of liquid leakage regarding the liquid container. For this reason, it is waste of manufacturing costs to provide the liquid container with a liquid holding member that is larger than necessary. Moreover, the liquid container according to Japanese Patent Laid-Open No. H05-4349 needs a communicating groove in order to guide the leaking ink to the liquid holding member. For this reason, a space for disposing the communicating groove in the liquid container is also required.

The ink re-absorbing member according to Japanese Patent Laid-Open No. 2002-178544 extends in the anti-gravitational direction and the gravitational direction from the supply port unit. For this reason, absorption of the leaking liquid may be complicated in a case where there is no space for extending the liquid holding member in the anti-gravitational direction or the gravitational direction from the supply port unit.

Given the circumstances, an object of the present disclosure is to provide a liquid container which is capable of holding a leaking liquid at high reliability while saving a space, and of suppressing contamination by the leaking liquid. Another object of the present disclosure is to reduce a size and costs of a liquid container.

SUMMARY

A liquid container according to the present disclosure for solving the above object is a liquid container attachable to a printing apparatus and configured to contain a liquid to be supplied to the printing apparatus, including: a container chamber configured to contain the liquid; a supply unit provided on a tip end side in a direction of attachment to be attached to the printing apparatus and configured to connect the container chamber to the printing apparatus; and a liquid holding unit provided to an inner peripheral surface of the supply unit and capable of holding the liquid by using a capillary force, the liquid leaking out in a case of attaching and detaching the liquid container to and from the printing apparatus. A length of the liquid holding unit in the direction of attachment of the liquid container is larger than a length of the liquid holding unit in a direction intersecting with the direction of attachment.

Further features of the present invention will become apparent from the following description of exemplary embodiments with reference to the attached drawings.

DESCRIPTION OF THE EMBODIMENTS

Embodiments of the present invention will be described below in detail.

First Embodiment

<Printing Apparatus 100>

Figure 1:
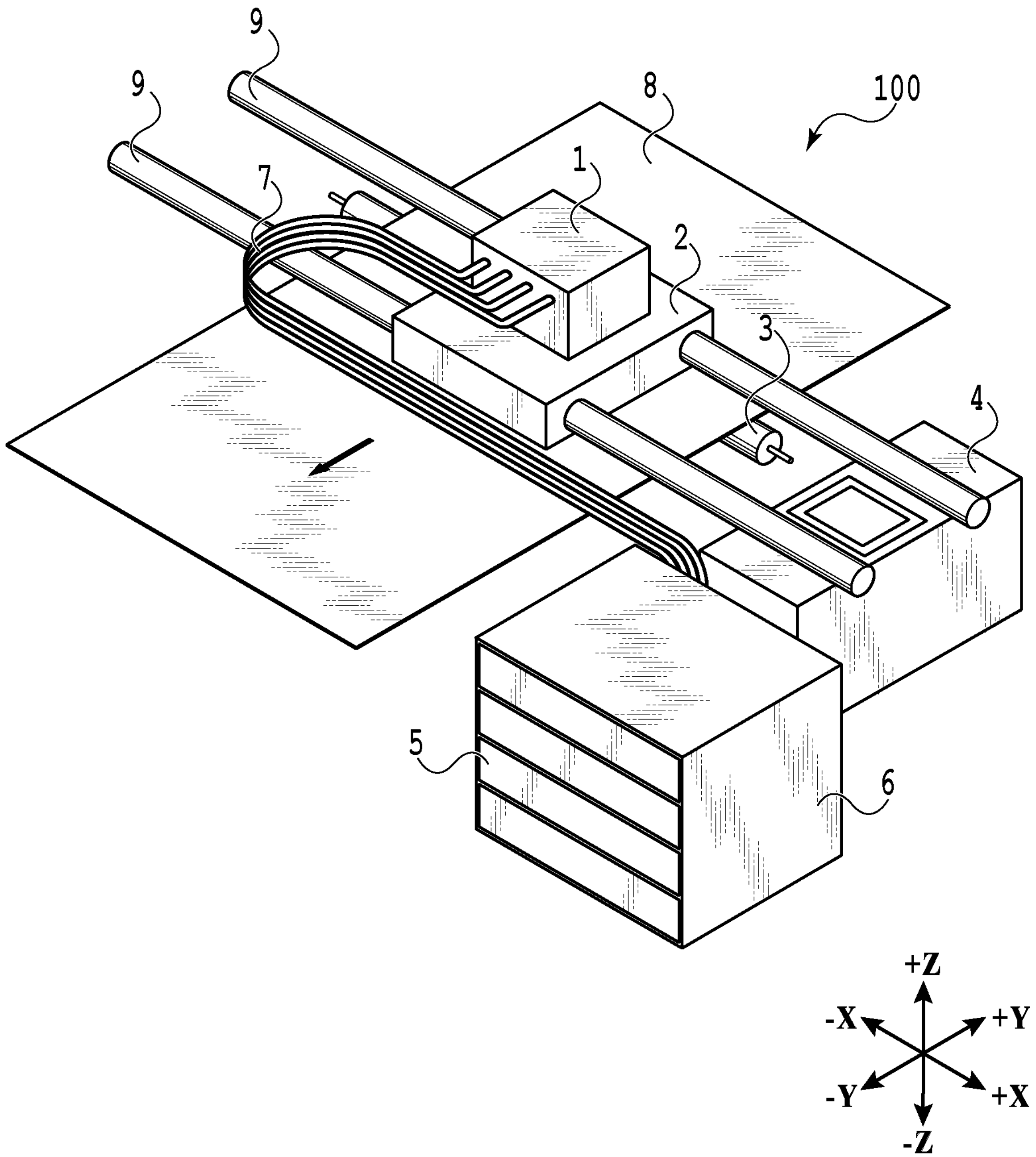
FIG. 1 is a perspective view showing a schematic configuration of a printing apparatus according to an embodiment.

FIG. 1 is a perspective view showing a schematic configuration of a printing apparatus 100 according to the present embodiment. As shown in FIG. 1, the printing apparatus 100 includes a print head 1, a carriage 2, a conveyance roller 3, a recovery unit 4, trays 5, a liquid supply unit 6, liquid supply tubes 7, and guide rails 9.

In the present embodiment, a direction of attachment to attach a liquid container 500 (see FIG. 2) provided inside each tray 5 to the printing apparatus 100 will be defined as +y direction. On the other hand, a direction to detach the liquid container 500 from the printing apparatus 100 will be defined as −y direction. Meanwhile, width directions of the liquid container 500 (that is, directions orthogonal to the y direction on a plane) will be defined as ±x directions. In the meantime, a gravitational direction (a downward direction) will be defined as −z direction while an anti-gravitational direction (an upward direction) will be defined as +z direction.

The printing apparatus 100 repeats reciprocation (main scanning) of the print head 1 and conveyance (vertical scanning) each at a predetermined pitch of a print sheet 8 as a print medium. The printing apparatus 100 is an apparatus to execute a printing operation by causing multiple types of liquids to be selectively ejected from the print head 1 and to land on the print sheet 8 as the print medium synchronously with the above-mentioned actions. Examples of the printing operation include formation of characters, codes, images, combinations thereof, and so forth. Any material can be used as the print medium as long as that material can form characters and the like by causing liquid droplets to land thereon. Various materials and forms can be used as such print media, examples of which include paper, fabrics, optical disc label surfaces, plastic sheets, OHP sheets, envelopes, and the like.

In FIG. 1, the print head 1 is slidably supported by the two guide rails 9 and is detachably mounted on the carriage 2 to be reciprocated on a straight line along the guide rails 9 by using a driving unit such as a not-illustrated motor. The print sheet 8 that is opposed to a liquid ejecting surface of the print head 1 and receives the liquids ejected from liquid ejection units of the print head 1 is conveyed in a direction intersecting with a traveling direction of the carriage 2 (that is, a direction of an arrow in FIG. 1) by using the conveyance roller 3 serving as a conveyance unit. The print head 1 includes nozzle arrays configured serving as the liquid ejection units, which perform printing by ejecting different types of liquids, respectively. Here, the different types of liquids may be inks of different colors or inks of the same color but with different properties like a pigment ink and a dye ink, for example.

The trays 5 each housing the liquid container 500 are detachably attached to the liquid supply unit 6. The liquid supply unit 6 is connected to the print head 1 by using the liquid supply tubes 7 that correspond to the types of the liquids, respectively. By attaching the liquid containers 500 to the liquid supply unit 6, it is possible to supply the various types of liquids contained in the liquid containers 500 independently to the respective nozzle arrays in the print head 1.

In a non-printing region being a region inside a range of reciprocation of the print head 1 and outside a region of passage of the print sheet 8, the recovery unit 4 is disposed in such a way as to be opposed to the liquid ejecting surface of the print head 1. The recovery unit 4 includes a cap unit for capping the liquid ejecting surface of the print head 1, a suctioning mechanism for forcibly suctioning the liquids in a state of capping the liquid ejecting surface, a cleaning blade for wiping stains off the liquid ejecting surface, and the like. Such a suctioning operation is carried out by the recovery unit 4 prior to the printing operation by the printing apparatus 100. Thus, bubbles remaining in an ejection unit of the print head 1 and a liquid with an increased viscosity which remains in the vicinity of an ejection port can be removed and ejection characteristics of the print head 1 can be maintained even in a case of activating the printing apparatus 100 after leaving the printing apparatus 100 unused for a long time.

<Liquid Container 500>

The liquid container 500 of the present embodiment will be described below with reference to FIGS. 2 to 6.

Figure 2:
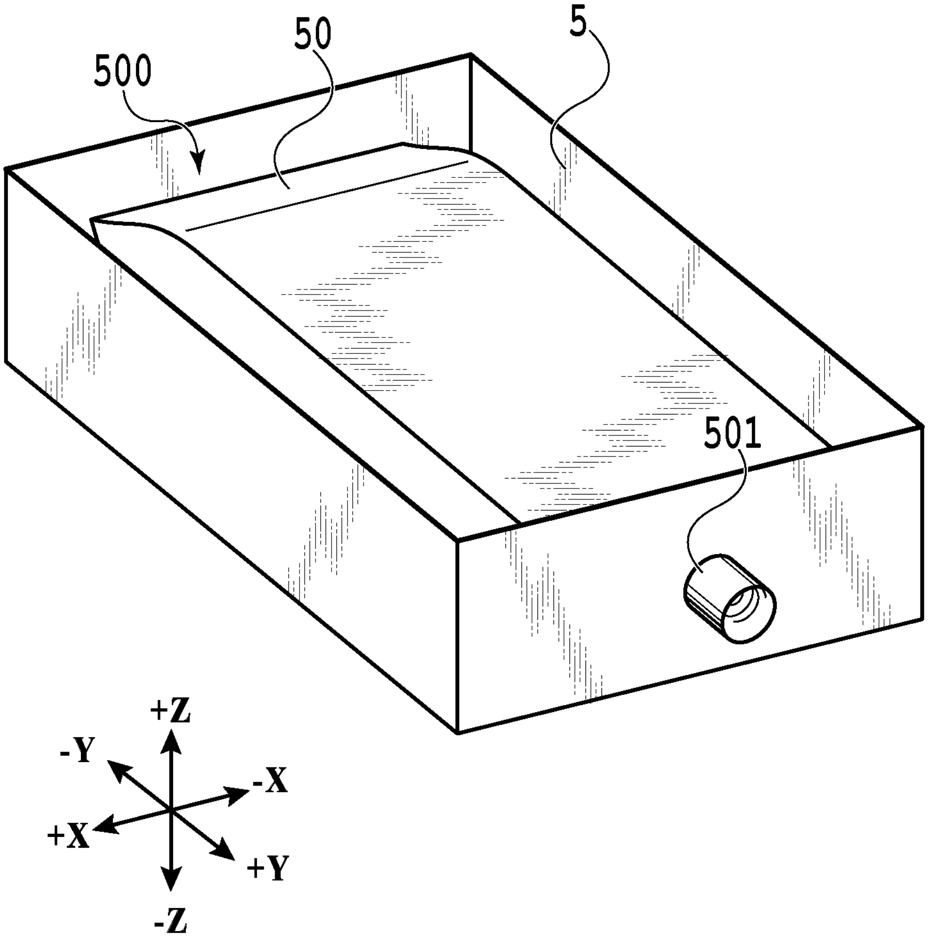
FIG. 2 is a perspective view schematically showing inside of a tray according to the embodiment.

FIG. 2 is a perspective view schematically showing inside of each tray 5 according to the present embodiment. As shown in FIG. 2, the liquid container 500 is detachably provided to the inside of the tray 5. The liquid container 500 includes a container chamber 50 that contains the liquid to be supplied to the printing apparatus 100, and a supply port 501 provided on a tip end side in a direction of attachment (that is, the +y direction side in FIG. 2) and configured to connect the container chamber 50 to the printing apparatus 100. The liquid containers 500 are independently provided for the respective types of the liquids to be contained in the container chamber 50. In the meantime, flow passages to supply the liquids from the liquid containers 500 to the printing apparatus 100 are formed by attaching the trays 5 embedding the liquid containers 500 to the liquid supply unit 6 in the printing apparatus 100.

Figure 3:
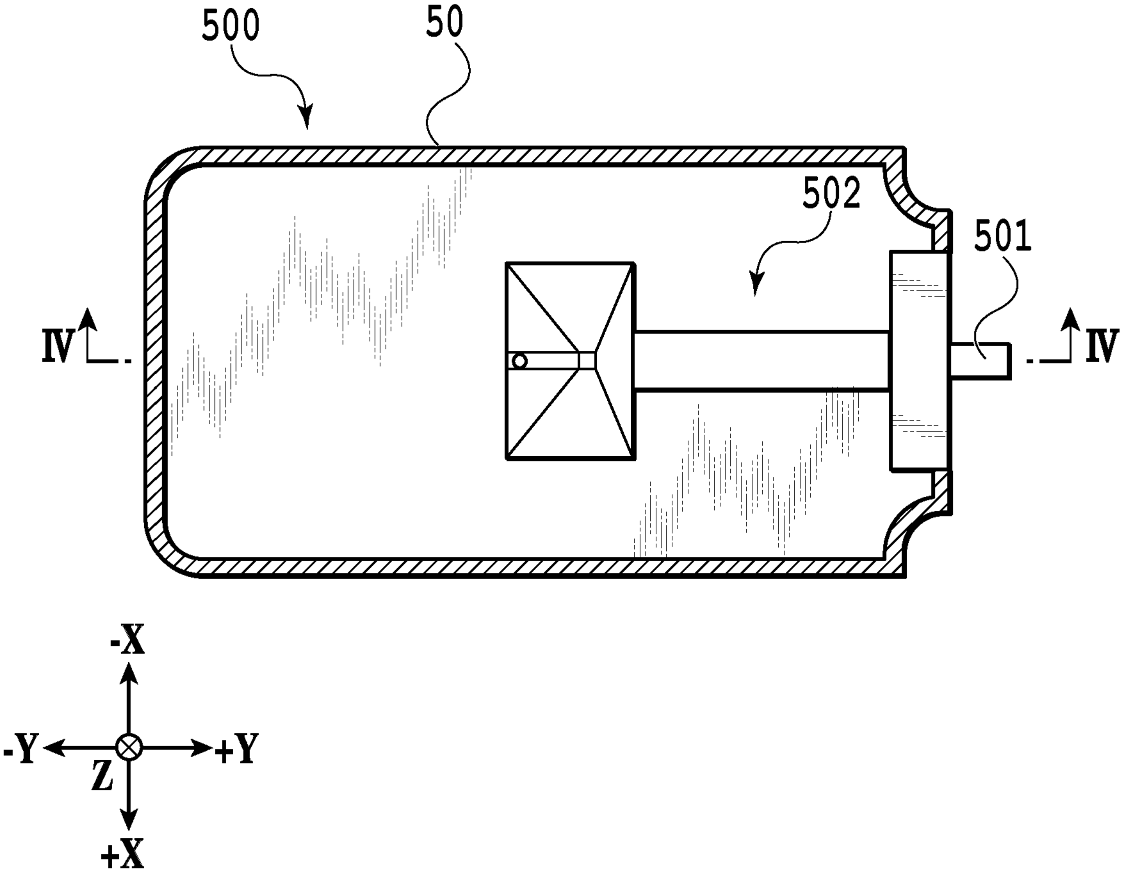
FIG. 3 is a schematic plan view showing inside of a liquid container according to the embodiment.

FIG. 3 is a schematic plan view showing inside of each liquid container 500 according to the present embodiment. FIG. 3 illustrates the liquid container 500 in an orientation of being attached to the printing apparatus 100. As shown in FIG. 3, a flow passage unit 502 provided with a flow passage that guides the contained liquid from a base end side to the tip end side in the direction of attachment is formed inside the container chamber 50 included in the liquid container 500. The supply port 501 serving as a supply unit that supplies the contained liquid to the printing apparatus 100 is formed on the tip end side in the direction of attachment of the flow passage unit 502. The supply port 501 extends further outward in the direction of attachment from one side provided on the attachment direction side of the container chamber 50.

Figure 4:
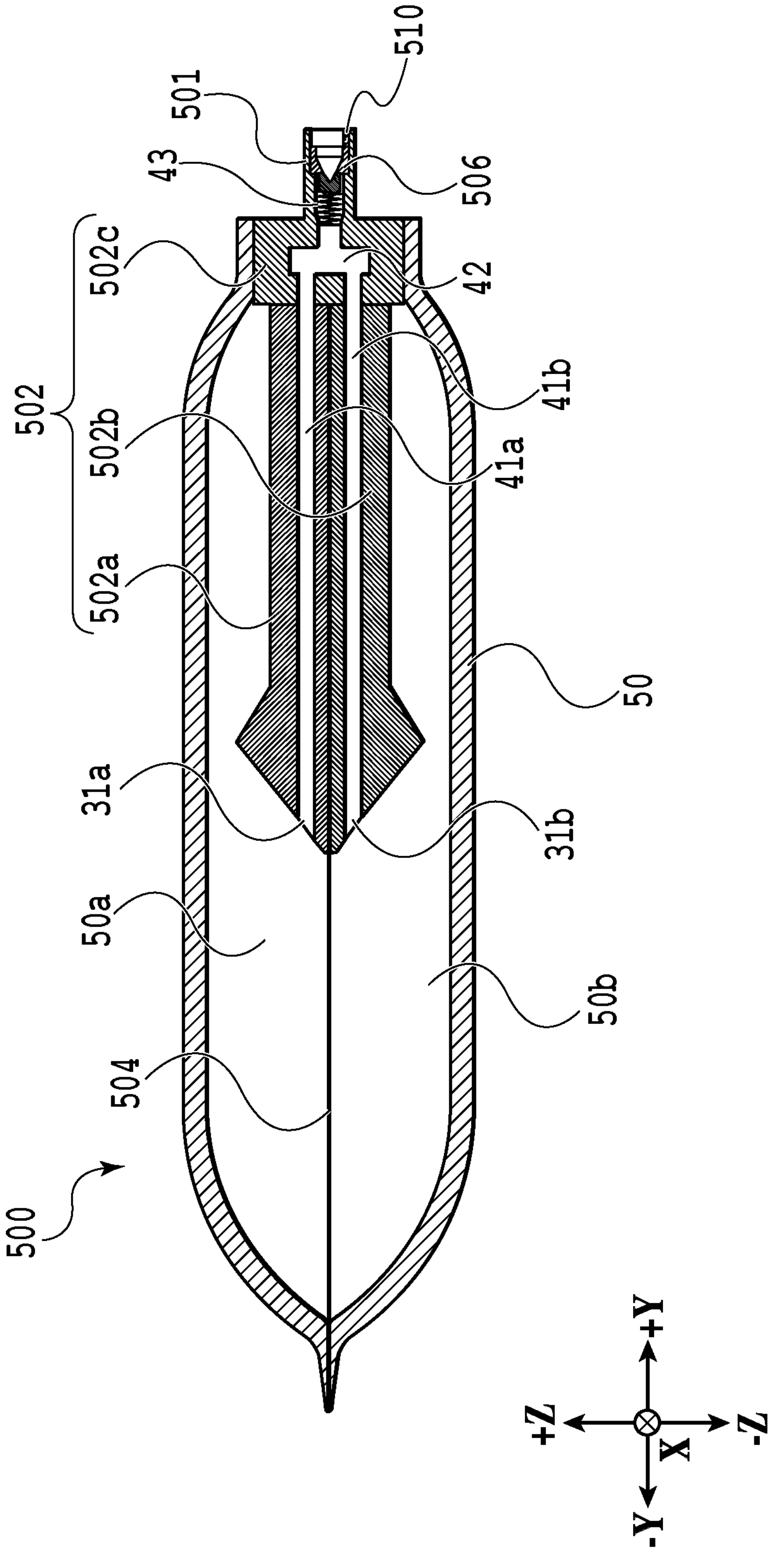
FIG. 4 is a schematic cross-sectional view taken along the Iv-Iv line in FIG. 3.

FIG. 4 is a schematic cross-sectional view taken along the Iv-Iv line in FIG. 3. As shown in FIG. 4, the flow passage unit 502 includes a first flow passage member **502*a* located on an upper side in the gravitational direction, a second flow passage member 502*b* located on a lower side in the gravitational direction, and a supply member 502*c* provided with the supply port 501** on the tip end side in the direction of attachment.

Meanwhile, the inside of the container chamber 50 is divided into a first container chamber **50*a* on the upper side in the gravitational direction and a second container chamber 50*b* on the lower side in the gravitational direction by a partitioning member 504 that is sandwiched between the first flow passage member 502*a* and the second flow passage member 502*b* and extends in a horizontal direction. According to the above-described configuration, it is possible to reduce a length in the gravitational direction (namely, a height) of each chamber for containing the liquid by about half and thus to reduce a difference in concentration in a direction of sedimentation of the liquid as compared to a liquid container of substantially the same size not provided with the partitioning member 504. Note that the provision of the partitioning member 504 to the liquid container 500** is an optional configuration example in the present disclosure.

A first introducing portion 31*a* to introduce the liquid contained in the first container chamber 50*a*, and a first flow passage 41*a* to guide the introduced liquid into the supply member 502*c* are formed in the first flow passage member 502*a*. A second introducing portion 31*b* to introduce the liquid contained in the second container chamber and a second flow passage 41*b* to guide the introduced liquid into the supply member 502*c* are formed in the second flow passage member 502*b*.

The supply member 502*c* includes a junction 42 where the liquids guided from the first flow passage 41*a* and the second flow passage 41*b* join together, and a third flow passage 43 continuously formed from the junction 42 toward the direction of attachment. The liquids joined together at the junction 42 are guided to the third flow passage 43. An opening of the third flow passage 43 is sealed by a sealing member 506. The sealing member 506 is formed from a water-unabsorbable material and is press-fitted from an opening of the supply port 501 in an opposite direction to the direction of attachment (that is, the −y direction in FIG. 4).

A liquid holding unit which extends in the direction of attachment and is capable of holding the liquid that may leak out in a case of attaching and detaching the liquid container 500 to and from the printing apparatus 100 is provided on an inner peripheral surface of the supply port 501 on an tip end side in the direction of attachment relative to the sealing member 506. In the present embodiment, a liquid holding member 510 serving as the liquid holding unit includes a fibrous body that absorbs the liquid by using a capillary force. As for a material constituting the liquid holding member 510, polypropylene, high-density polyethylene, and a mixture agent thereof can be suitably used, for example. In the present embodiment, the liquid holding member 510 is disposed on the gravitational direction side of the inner peripheral surface of the supply port 501, because the liquid leaking out in the course of attaching or detaching the liquid container 500 drops in the gravitational direction.

Figure 5:
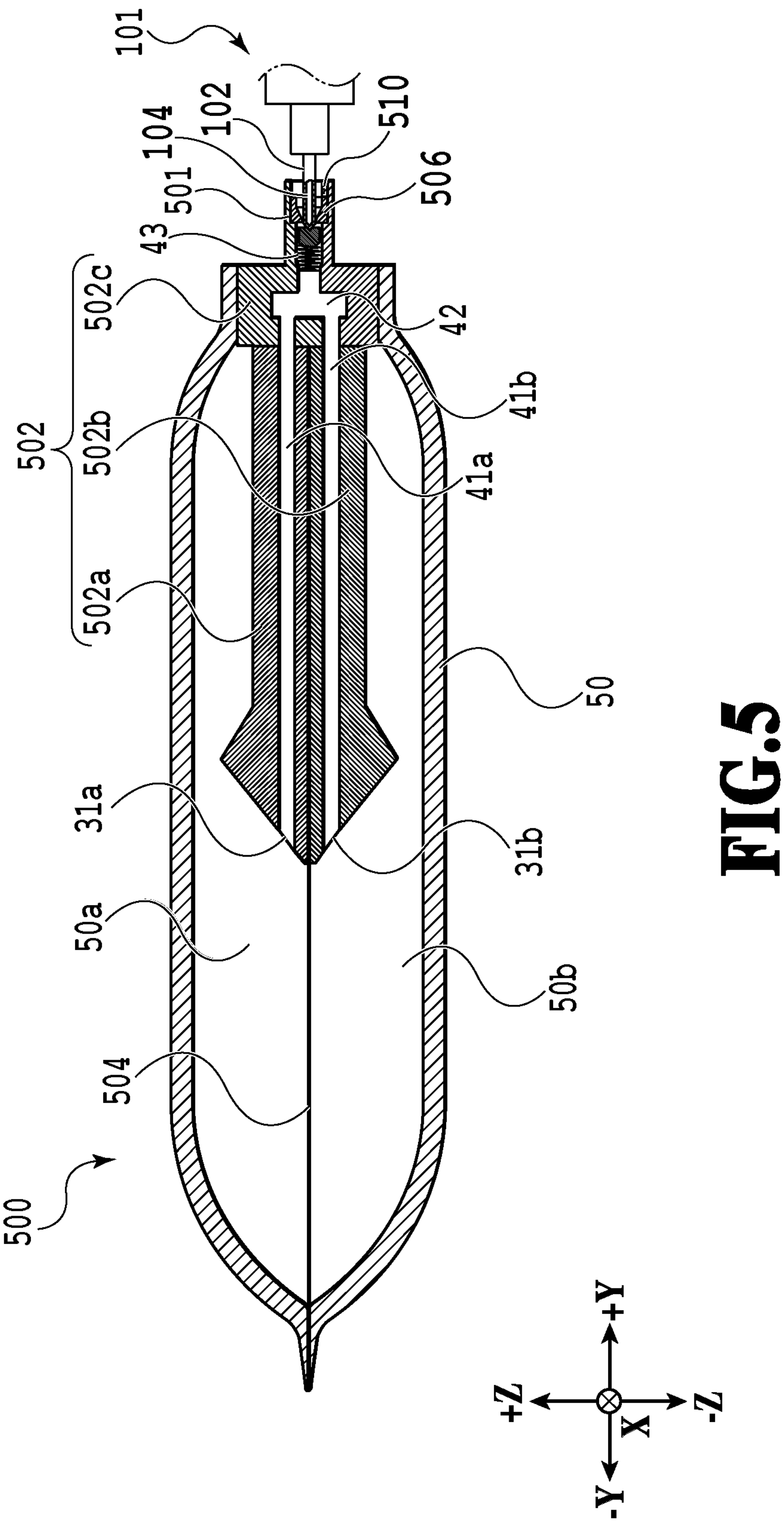
FIG. 5 is a schematic cross-sectional view showing a state where the liquid container according to the embodiment is attached to the printing apparatus.

FIG. 5 is a schematic cross-sectional view showing a state where the liquid container 500 according to the present embodiment is attached to the printing apparatus 100. As shown in FIG. 5, the liquid container 500 is attachable to the printing apparatus 100. The printing apparatus 100 is provided with a pump mechanism (not shown) that suctions the liquid contained in the liquid container 500. In the case where the above-described printing operation is executed, the liquid in the liquid container 500 is suctioned into the printing apparatus 100 by a negative pressure generated by suctioning of the pump mechanism. Meanwhile, a hollow needle unit 101 provided with a hollow needle 102 is incorporated in the liquid supply unit 6 included in the printing apparatus 100.

The hollow needle unit 101 functions as a connector unit to the supply port 501 included in the liquid container 500. By connecting the supply port 501 included in the liquid container 500 to the hollow needle unit 101 provided to the printing apparatus 100, it is possible to insert the hollow needle 102 provided to the printing apparatus 100 relatively into the third flow passage 43 provided to the liquid container 500. A communicating hole (not shown) to introduce the liquid from the outside to the inside of the hollow needle 102 is formed in the hollow needle 102.

By inserting the hollow needle 102 into the third flow passage 43, the liquid guided from the first introducing portion 31*a* and the second introducing portion 31*b* included in the liquid container 500 to the third flow passage 43 can be introduced into a hollow flow passage 104 provided to the printing apparatus 100. As a consequence, according to the above-described configuration, it is possible to supply the liquid contained in the liquid container 500 to the print head 1 through the hollow needle unit 101 provided to the printing apparatus 100 and through the liquid supply tube 7.

Figure 6:
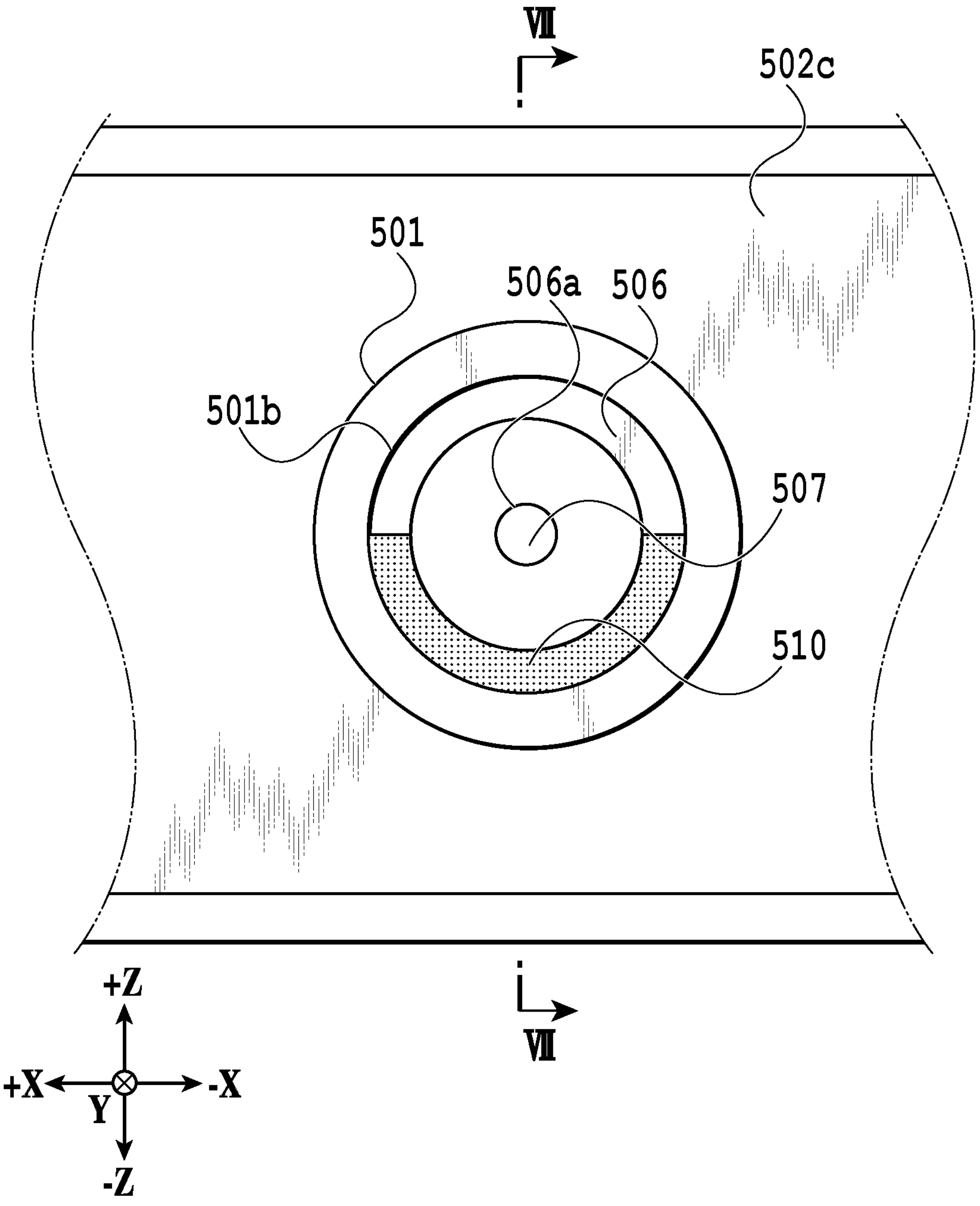
FIG. 6 is a schematic front view of a supply port according to the embodiment.

FIG. 6 is a schematic front view of the supply port 501 according to the present embodiment. In the following description, an opening located on a base end side in the direction of attachment of the supply port 501 and sealed by the sealing member 506 (that is, an opening of the third flow passage 43) will be referred to as a first opening 501*a* (see FIGS. 7A to 7C) for the convenience of description. Moreover, an opening located on a tip end side in the direction of attachment and not sealed by the sealing member 506 will be referred to as a second opening 501*b*. As shown in FIG. 6, the sealing member 506 is press-fitted into the second opening 501*b* of the supply port 501. A through hole 506*a* that penetrates the sealing member 506 in the direction of attachment (that is, the y direction) is formed in the sealing member 506. Here, a valve body 507 to occlude the through hole 506*a* is seen in FIG. 6. Moreover, the liquid holding member 510 formed into a nearly equal thickness to a tip end side of the sealing member 506 is provided along an inner surface of the supply port 501 between the tip end side of the sealing member 506 and the second opening 501*b* side of the supply port 501 (see also FIG. 7A). In other words, the liquid holding member 510 is provided between the tip end side of the sealing member 506 and the second opening 501*b* of the supply port 501 in such a way as to extend along a region corresponding to a lower half in the state where the liquid container 500 is attached to the printing apparatus 100.

<Holding Liquids>

Figure 7A:
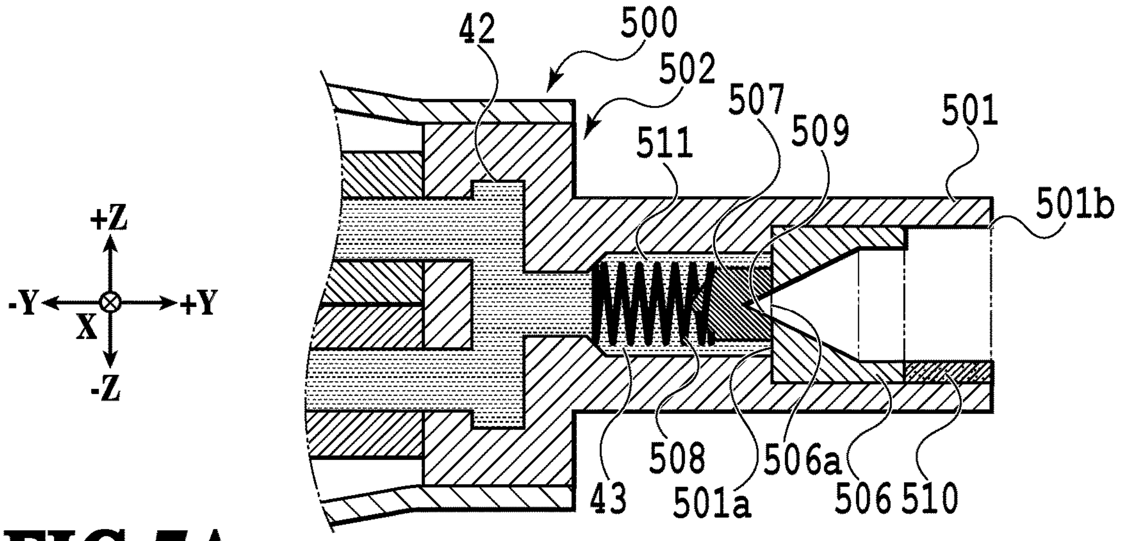
FIGS. 7A, 7B, and 7C are schematic enlarged cross-sectional views showing a process of attaching and detaching the liquid container according to the embodiment to and from the printing apparatus.
Figure 7B:
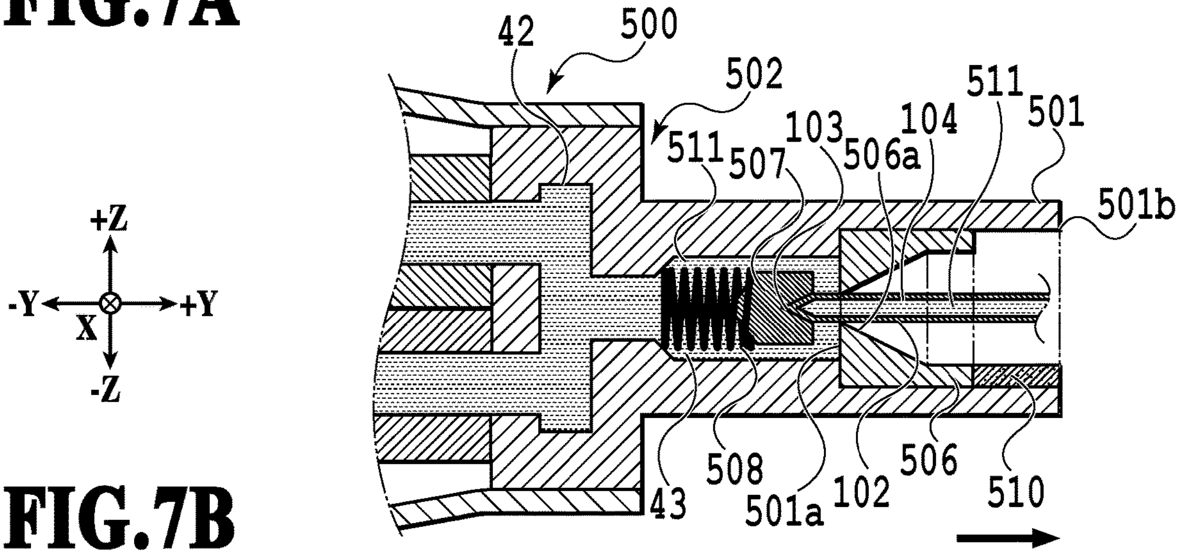
Figure 7C:
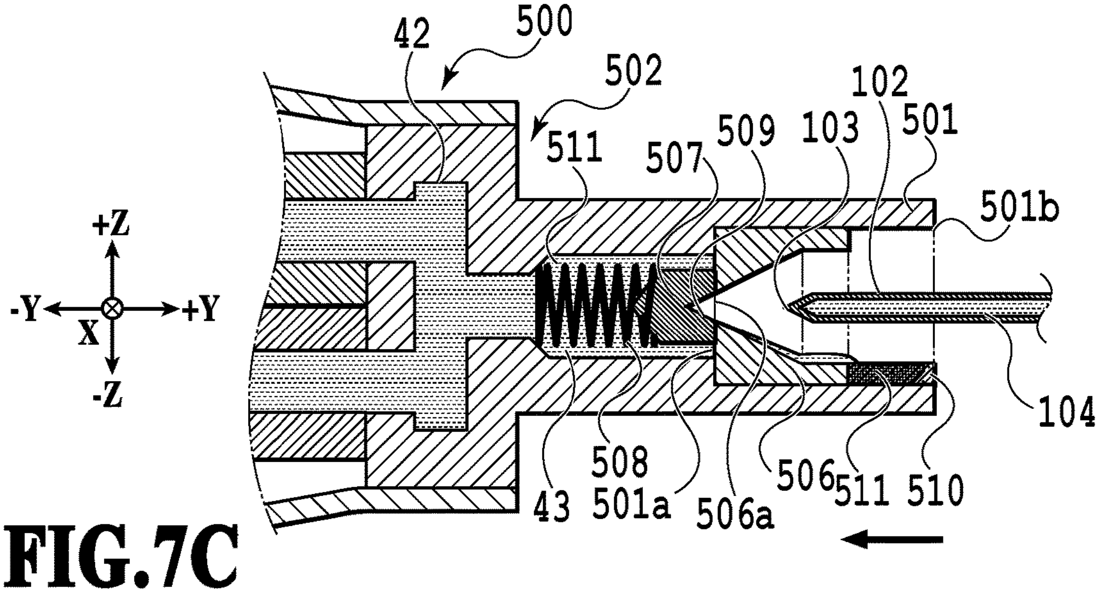

FIGS. 7A to 7C are schematic enlarged cross-sectional views showing a process of attaching and detaching the liquid container 500 according to the present embodiment to and from the printing apparatus 100.

FIG. 7A is taken along the VII-VII line in FIG. 6 and shows a state before the liquid container 500 is attached to the printing apparatus 100. As shown in FIG. 7A, an inside diameter of through hole 506*a* formed in the sealing member 506 has different sizes between the base end side and the tip end side in the direction of attachment. The through hole 506*a* maintains the same diameter from the tip end side of the sealing member 506 to an intermediate position in the opposite direction to the direction of attachment. However, this diameter is gradually reduced from the intermediate position on. Meanwhile, a coil spring 508 and the valve body 507 are disposed in the third flow passage 43. One end of the coil spring 508 is fixed to a base end portion inside the third flow passage 43 and the other end thereof is fixed to the valve body 507. The valve body 507 is biased in the direction of attachment (the rightward direction in FIG. 7A) by the coil spring 508, and comes into contact with a peripheral portion of the through hole 506*a* from a back surface side (that is, from a surface side oriented to the −y direction) of the sealing member 506, thereby occluding the through hole 506*a*. Thus, the opening of the third flow passage 43 (namely, the first opening 501*a*) is completely sealed. Here, the sealing member 506 preferably has rigidity that is sufficient for withstanding pressure application from the valve body 507 considering that the valve body 507 biased by the coil spring 508 comes into contact with the sealing member 506 and thereby occludes the through hole 506*a*. Meanwhile, the liquid holding member 510 having the nearly equal thickness to the tip end side of the sealing member 506 is provided along the inner surface of the supply port 501 between the tip end side of the sealing member 506 and the second opening 501*b* of the supply port 501.

FIG. 7B shows a state where the liquid container 500 is attached to the printing apparatus 100. An arrow shown on the lower right in FIG. 7B indicates the direction of attachment to attach the liquid container 500 to the printing apparatus 100. As shown in FIG. 7B, a tapered apical portion 103 is formed on a tip end side of the hollow needle 102 on the printing apparatus 100 side.

Meanwhile, an engagement portion 509 (see FIG. 7A) is formed on a front surface (a surface oriented to the +y direction) of the valve body 507 on the liquid container 500 side so as to correspond to a shape of the apical portion 103 of the hollow needle 102. In the process of attachment, the hollow needle 102 is inserted into the through hole 506*a*, and the apical portion 103 of the hollow needle 102 is engaged with the engagement portion 509 of the valve body 507. Then, the valve body 507 pressed by the hollow needle 102 moves in the opposite direction to the direction of attachment against the biasing force of the coil spring 508. Thus, the valve body 507 is detached from the through hole 506*a*, so that the liquid in the third flow passage 43 can move into the hollow flow passage 104 through the communicating hole (not shown) provided in the vicinity of the apical portion 103 of the hollow needle 102, and then flow into a body of the hollow needle unit 101. In other words, a flow passage to supply the liquid from the liquid container 500 to the printing apparatus 100 is formed by inserting the hollow needle 102 into the through hole 506*a* and moving the valve body 507 with the hollow needle 102. Here, in the illustrated state, the hollow needle 102 is in a state of being closely engaged with a hole portion with the smaller inside diameter in the through hole 506*a*. According to the above-described configuration, it is possible to supply the liquid to the printing apparatus 100 while suppressing leakage of the liquid from a gap between the hollow needle 102 and the through hole 506*a* in the case where the liquid container 500 is attached to the printing apparatus 100.

As shown in FIG. 7B, the inside diameter on the tip end side of the sealing member 506 is formed larger than that of the through hole 506*a* of the sealing member 506. Moreover, the inside diameter from the tip end side of the sealing member 506 to the second opening 501*b* of the supply port 501 is formed into an even larger diameter so as to constitute a stepped structure. The liquid holding member 510 is provided on the inner surface of the supply port 501 with such a thickness that makes up for this step. Meanwhile, as apparent from FIG. 7B, the inside diameter on the tip end side of the sealing member 506 and the inside diameter from the tip end side of the sealing member 506 to the second opening 501*b* of the supply port 501 are sufficiently larger than a diameter of the hollow needle 102. Accordingly, the region having the large inside diameter does not hinder the movement of the hollow needle 102 in the liquid container 500 in the case of carrying out the operation to attach and detach the liquid container 500 to and from the printing apparatus 100.

Thereafter, in the case where the liquid in the liquid container 500 is depleted in the illustrated state, the liquid container 500 that has been attached to the printing apparatus 100 is detached and replaced with a new liquid container 500. In other words, the liquid containers 500 are detached and attached at this timing in general.

In the following description, the timing to carry out the replacement of the liquid containers 500 will be referred to as "replacement timing".

FIG. 7C shows a state where the liquid container 500 in the state of FIG. 7B is detached from the printing apparatus 100. An arrow shown on the lower right in FIG. 7C indicates a direction of detachment to detach the liquid container 500 from the printing apparatus 100. In the case of detaching the liquid container 500 from the printing apparatus 100, the valve body 507 and the coil spring 508 are operated in reverse order to the order at the time of attachment of the liquid container 500. Specifically, the through hole 506*a* is occluded again by the valve body 507.

Here, even though the through hole 506*a* is occluded by the valve body 507, there is a case where a liquid 511 remaining in the third flow passage 43 leaks out from the through hole 506*a* as the hollow needle 102 is pulled out of the through hole 506*a*. Meanwhile, there is also a case where the liquid 511 remaining in the hollow flow passage 104 leaks out from the communicating hole (not shown) formed in the hollow needle 102 after the hollow needle 102 is pulled out of the through hole 506*a*. Moreover, the hollow needle 102 is basically in the state of close engagement with the hole portion having the smaller inside diameter in the through hole 506*a*. Accordingly, in the case where the liquid container 500 is pulled out, the ink around the hollow needle 102 is in a wiped state. However, in case the liquid 511 remains adhering to a surface of the hollow needle 102 in the state of being pulled out due to an unforeseen circumstance, this liquid may drop onto an inner peripheral surface of the through hole 506*a* or the inner surface of the supply port 501. In such a case, the leaking liquid 511 may reach the second opening 501*b* through an inner surface of the sealing member 506 and the inner surface of the supply port 501 (to be described later with reference to FIG. 9C). Even in the case where the liquid 511 is about to remain or leak out as described above, the present embodiment is configured to cause the liquid holding member 510 provided on the inner peripheral surface of the second opening 501*b* of the supply port 501 to absorb or recover the liquid 511 by using the capillary force. As a consequence, it is possible to keep the liquid 511 from leaking or spattering out of the second opening 501*b* of the supply port 501.

In comparison between a length in the direction of attachment of the liquid holding member 510 and a length in a direction intersecting with the direction of attachment thereof in the present embodiment, the length in the direction of attachment is larger than the length in the direction intersecting with the direction of attachment in the present embodiment. To be more precise, in comparison between the length in the direction of attachment (the y direction) of the liquid holding member 510 and the length in the gravitational direction thereof (the z direction) intersecting with the direction of attachment, the length in the direction of attachment is larger than the length in the gravitational direction. According to this configuration, the liquid leaking out of the through hole 506*a* is sequentially recovered from a back side of the liquid holding member 510 provided to the supply port 501 toward the second opening 501*b* side as shown in FIG. 7C. As described above, even though the liquid may sequentially move from the back side of the liquid holding member 510 toward the second opening 501*b* side of supply port 501, the liquid is kept from reaching the outside of the second opening 501*b* since the sufficient length is secured relative to an estimated amount of the liquid (FIG. 7C shows a state where the liquid does not reach the second opening 501*b*). Meanwhile, even in a case where the liquid adhering to the communicating hole in the hollow needle 102 or the portion around the hollow needle 102 drips, it is more likely that the dripping liquid is successfully recovered since the sufficient length of the liquid holding member 510 can be secured relative to a movement path of the hollow needle 102.

Here, desired movement of the liquid only needs to be enabled in order to obtain a configuration to keep the leaking or dripping liquid from reaching the second opening 501*b* of the supply port 501 more reliably. The desired movement of the liquid is enabled by configuring the liquid holding member 510 such that the capillary force toward the direction of attachment (to the back side of the liquid holding member 510) of the liquid container 500 is larger than the capillary force toward the second opening 501*b* side, for example.

According to the above-described configuration, even in the case where there is no space to extend the liquid holding member 510 in the gravitational direction or the anti-gravitational direction inside the supply port 501 as in this configuration example, it is still possible to absorb the liquid in the direction intersecting with the gravitational direction and thus to hold the liquid effectively. Therefore, the liquid 511 that may leak out in the case of attaching and detaching the liquid container 500 can be kept from spattering out of the second opening 501*b* of the supply port 501.

Meanwhile, by establishing the state of keeping the liquid from reaching the second opening 501*b* of the supply port 501, it is less likely that the liquid stains a finger, a garment, a desk, a wall, and the like even in a case where the second opening 501*b* of the liquid container 500 detached after use comes into contact with the finger, the garment, the desk, the wall, and the like.

Comparative Example

In order to facilitate understanding of the liquid container 500 according to the present embodiment, an effect of providing the liquid holding member 510 will be described below based on a virtual configuration as a comparative example, in which the liquid holding member 510 is not provided.

Figure 8:
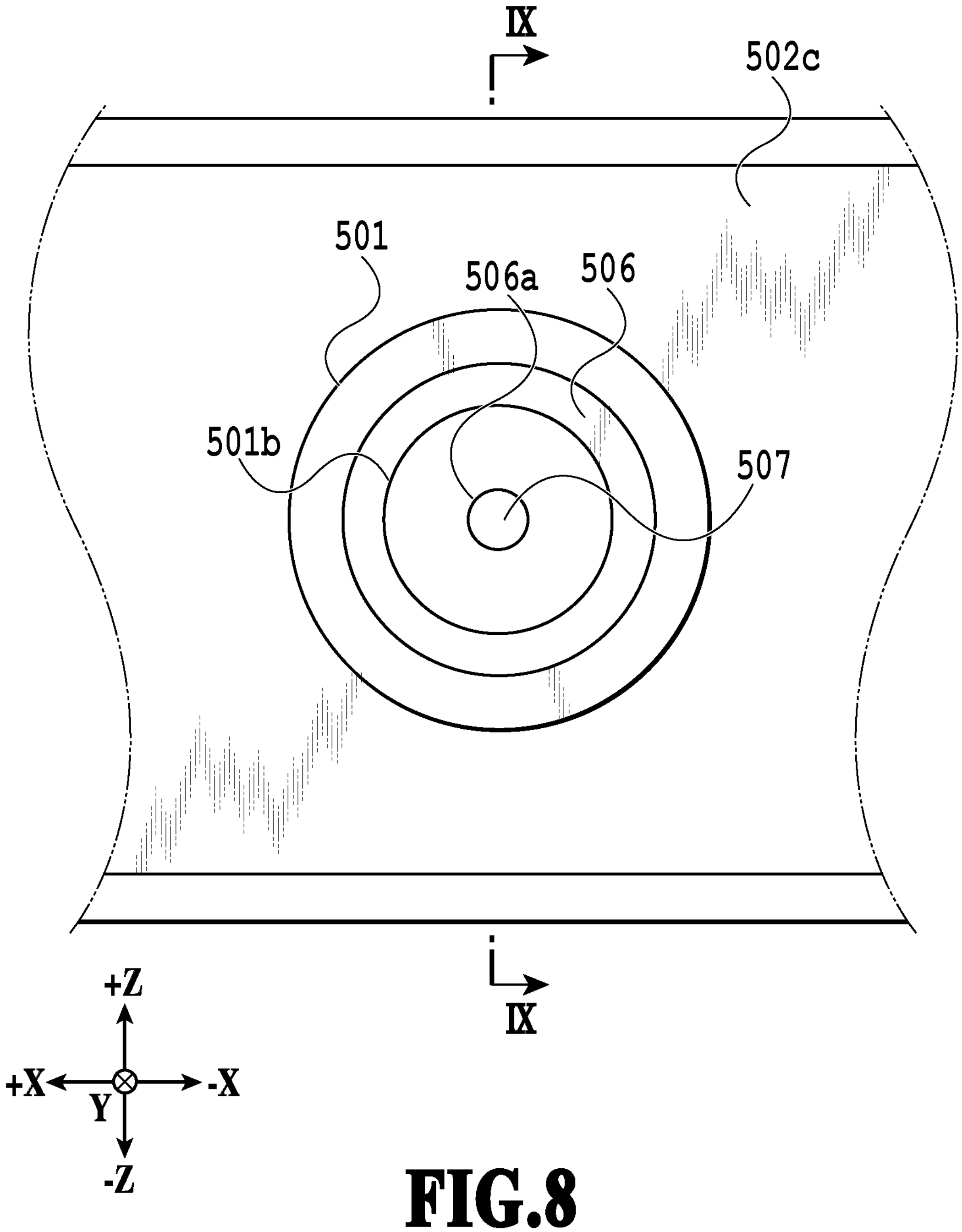
FIG. 8 is a schematic front view of a supply port according to a comparative example.

FIG. 8 is a schematic front view of the supply port 501 according to the comparative example. As shown in FIG. 8, the supply port 501 of the liquid container 500 of the comparative example is not provided with the liquid holding member 510. In FIG. 8, the hole portion with the larger inside diameter side of the through hole 506*a* serves as the second opening 501*b* of the supply port 501 since the liquid holding member 510 is not provided therein.

Figure 9A:
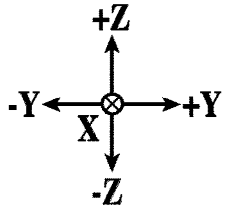
FIGS. 9A, 9B, and 9C are schematic enlarged cross-sectional views showing a process of attaching and detaching a liquid container according to the comparative example to and from a printing apparatus.
Figure 9A:
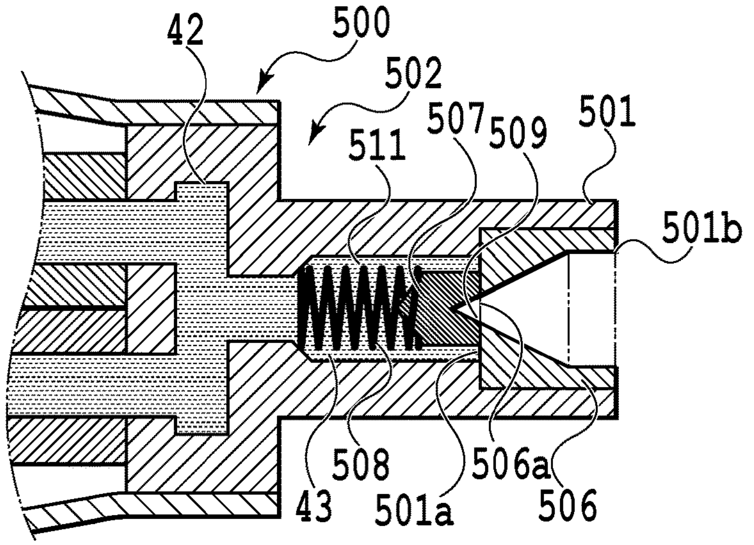
Figure 9B:
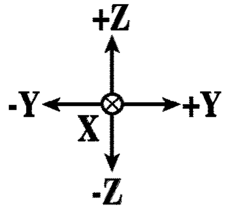
Figure 9B:
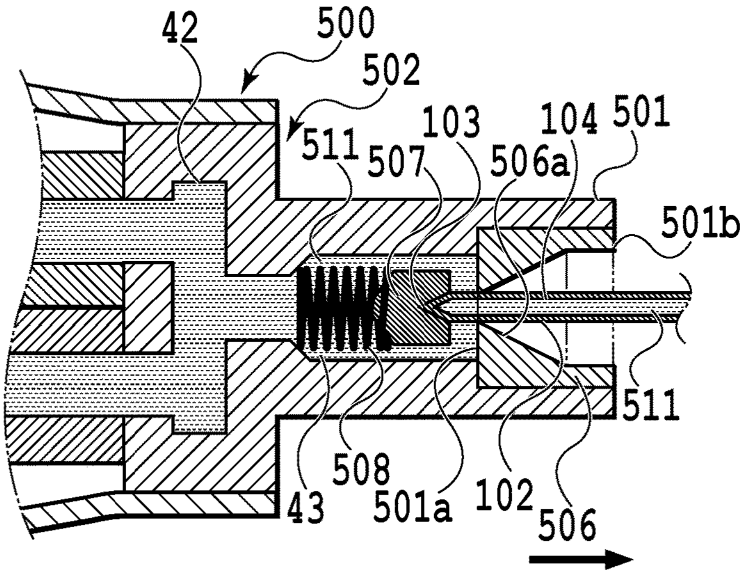
Figure 9C:
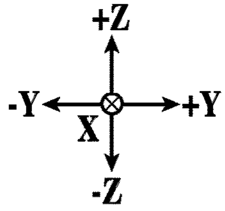
Figure 9C:
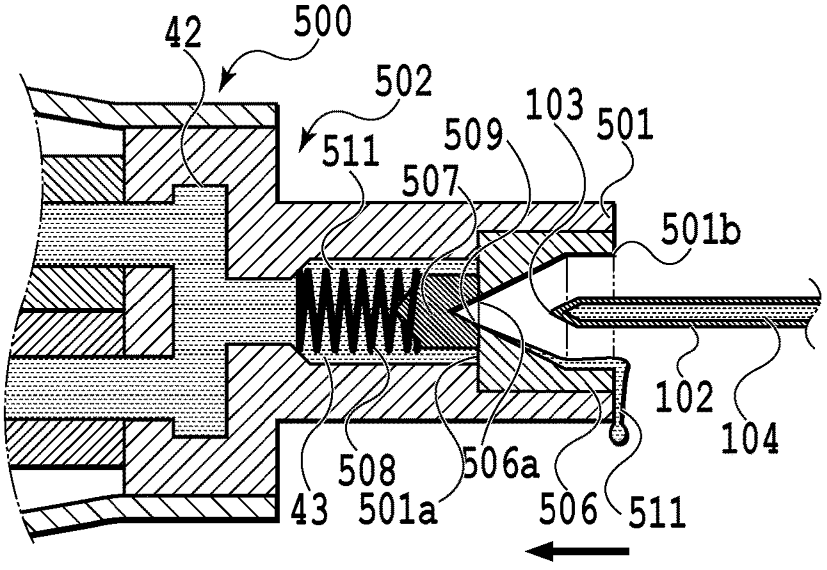

FIGS. 9A to 9C are schematic enlarged cross-sectional views showing a process of attaching and detaching the liquid container 500 according to the comparative example to and from the printing apparatus 100. FIG. 9A shows a state before the liquid container 500 of the comparative example is attached to the printing apparatus 100. FIG. 9B shows a state after the liquid container 500 of the comparative example is attached to the printing apparatus 100. FIG. 9C shows a state where the liquid container 500 of the comparative example is detached from the printing apparatus 100.

In the case where the liquid container 500 does not include the liquid holding member 510 as shown in FIG. 9C, the liquid 511 leaking out in the course of attaching or detaching the liquid container 500 remains on the inner peripheral surface of the through hole 506*a* since the valve body 507 occludes the through hole 506*a* and the liquid cannot return into the liquid container 500. Then, the liquid 511 remaining on the inner peripheral surface of the through hole 506*a* may drip or spatter out from the second opening 501*b* of the supply port 501. In other words, in the case where the liquid container 500 does not include the liquid holding member 510, the leaking liquid 511 may contaminate a surrounding area. The effect of providing the liquid holding member 510 has been described above.

<Liquid Holding Member 510>

Meanwhile, as described with reference to FIG. 7B, the depleted liquid container 500 is generally detached at the replacement timing of the liquid container 500 and the new liquid container 500 is attached instead. In other words, the number of times of attachment and detachment of the liquid containers 500 is generally once.

However, there may be case where a user attaches and detaches the liquid containers 500 several times at irregular timing for some reason.

In the present embodiment, the number of times of attachment and detachment of the liquid container 500 to and from the printing apparatus 100 at irregular timing is assumed to be up to twice. In other words, the present embodiment assumes that the attachment and detachment may be carried out three times in total (once at the general timing and twice at the irregular timing). Accordingly, the liquid holding member 510 of the present embodiment is configured to be capable of sufficiently absorbing the leaking liquid even in the case of carrying out the attachment and detachment three times.

The present embodiment assumes that a drop of the liquid may leak out as a consequence of carrying out the attachment and detachment each time. Moreover, an amount of the drop of the liquid is assumed to be about 0.005 ml. Given the circumstances, an amount of liquid leakage in the present embodiment can be roughly calculated in accordance with the following formula:

$$\text{Amount of liquid leakage(about0.005 ml) for each time of attachment and detachment} \times \text{the total number of times of attachment and detachment (three times)} = \text{about0.015 ml} \quad \text{(Formula 1).}$$

Here, a volume of the fibrous body that can absorb the entire leaking liquid (that is, the liquid in the amount of about 0.015 ml) is equal to about 24 $mm^3$. Accordingly, the fibrous body with the volume of about 24 $mm^3$ or above can absorb the leaking liquid sufficiently.

An example a layout in the liquid holding member 510 will be described below. Assuming that the inside diameter of the supply port 501 is equal to $\phi$ 5.0 mm, a circumference of the supply port 501 is equal to about 15.7 mm. In this case, the length of the semiperimeter of the supply port 501 is equal to about 7.85 mm. Here, in the case of the providing the liquid holding member 510 on the gravitational direction side on the inner peripheral surface of the second opening 501*b*, a height (that is, a length in the z direction) of the liquid holding member 510 may be set to about 1.0 mm, and a length in the direction of attachment (that is, a length in they direction) thereof may be set to about 3.0 mm. According to the above-described layout, it is possible to ensure the volume of the liquid holding member 510 equal to or above about 24 $mm^3$. The layout of the liquid holding member 510 has been described above.

<Conclusion>

As described above, the liquid holding unit according to the present embodiment is provided as part of the supply port in a relatively small region which is the inner peripheral surface of the supply port. As a consequence, it is possible to reduce the size of the liquid holding unit as compared to the related art, and it is not necessary to prepare a new region for disposing the liquid holding unit.

Therefore, according to the liquid container of the present embodiment, it is possible to hold the leaking liquid at high reliability while saving a space, and to suppress contamination due to the liquid leakage. Moreover, it is possible to reduce the size and the costs of the liquid container.

Modified Example 1

In the present modified example, another liquid holding unit is also provided on the anti-gravitational direction side of the inner peripheral surface of the second opening 501*b* of the supply port 501.

Figure 10B:
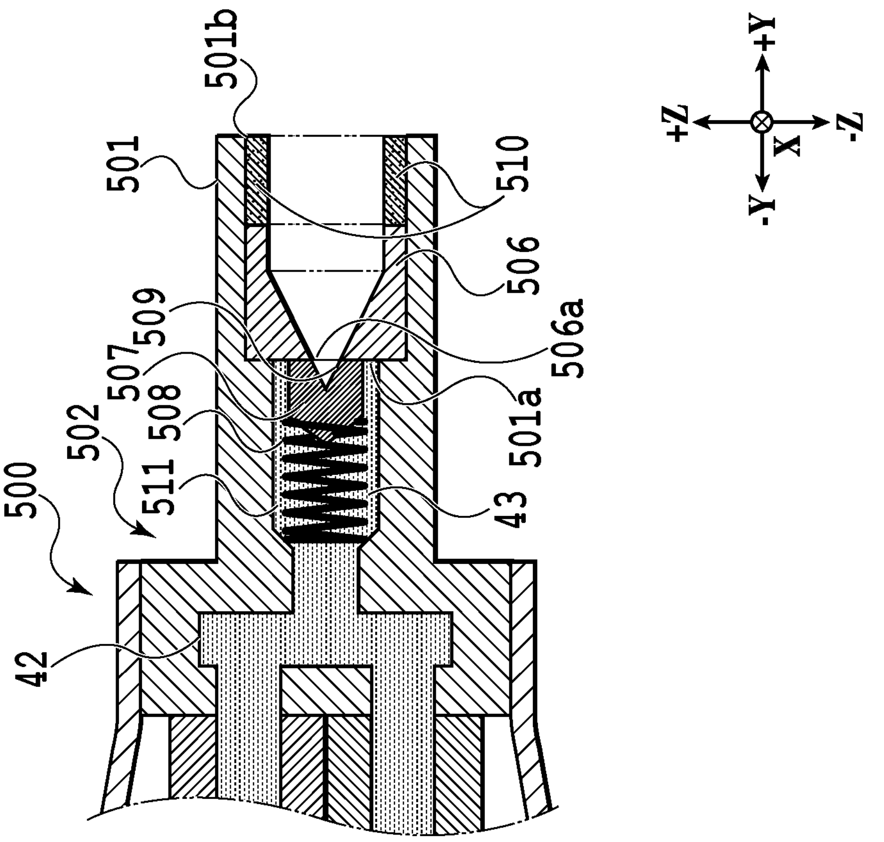
FIG. 10A is a schematic front view and FIG. 10B is a schematic enlarged cross-sectional view showing a liquid holding unit according to a modified example.
Figure 10A:
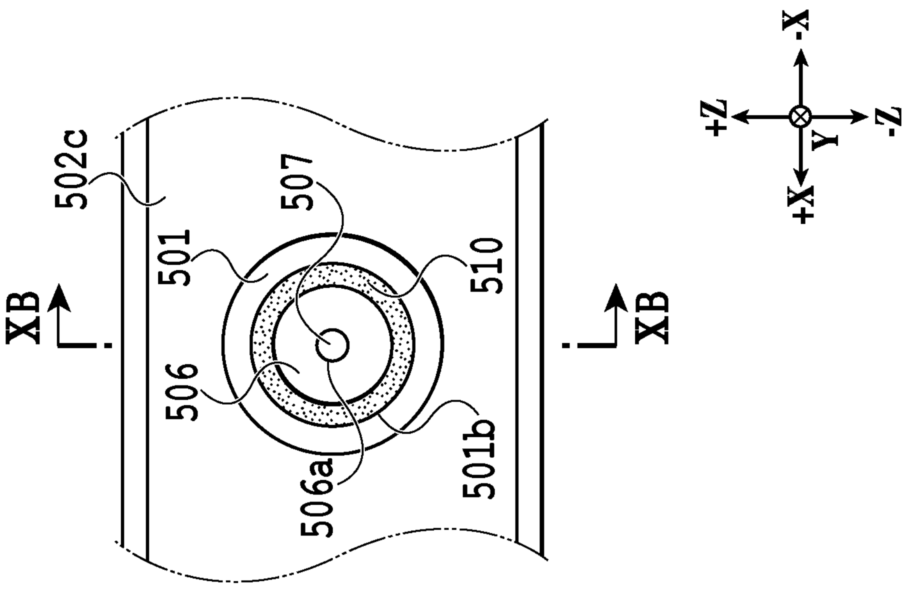

FIGS. 10A and 10B are schematic diagrams showing a liquid holding unit of the present modified example. FIG. 10A is a schematic front view of the supply port 501 of the present modified example. FIG. 10B is a schematic cross-sectional view taken along the Xb-Xb line in FIG. 10A.

As shown in FIG. 10A, in the present modified example, the liquid holding member 510 is continuously disposed in a circumferential direction along the inner peripheral surface of the second opening 501*b*. According to this configuration, the volume of the liquid holding member 510 of the present modified example exceeds 24 $mm^3$ or above as mentioned earlier (doubled to 48 $mm^3$, for example). As a consequence of disposing the liquid holding member 510 on the gravitational direction side and the anti-gravitational direction side on the inner peripheral surface of the second opening 501*b*, it is possible to hold the liquid 511 even in a case where more than the expected amount of the liquid 511 leaks out. According to this configuration, the amount of the liquid that can be held by the liquid holding member 510 exceeds 0.015 ml or above as mentioned earlier (doubled to 0.030 ml, for example).

Meanwhile, adoption of a symmetric configuration of the liquid container 500 in terms of a width direction (that is, the x direction in FIGS. 10A and 10B) by disposing the liquid holding member 510 on the gravitational direction side and the anti-gravitational direction side makes it possible to eliminate a difference between two surfaces in the case of embedding the liquid container 500 into the tray 5. In other words, it is possible to improve usability at the time of attaching the liquid container 500.

In the meantime, in case the liquid container 500 falls for some reason, the direction of spatter of the leaking liquid 511 is not settled. According to the configuration of the present modified example, it is possible to absorb the liquid regardless of which direction the leaking liquid 511 spatters in the radial direction of the supply port 501 inside the second opening 501*b* since the liquid holding member 510 is present in any direction. In other words, since the liquid holding member 510 is disposed not only on the gravitational direction side but also on the anti-gravitational direction side on the inner peripheral surface of the second opening 501*b* of the present modified example, it is possible to further suppress the spatter of the liquid in the case of attaching and detaching the liquid container 500.

Modified Example 2

Figure 11B:
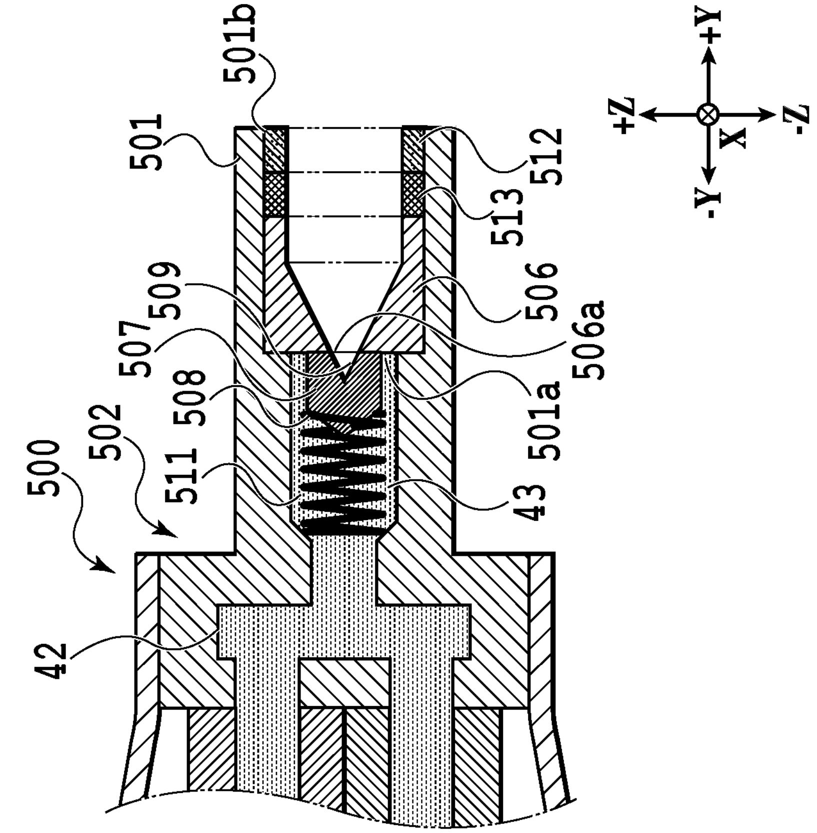
FIG. 11A is a schematic front view and FIG. 11B is a schematic enlarged cross-sectional view showing a liquid holding unit according to another modified example.
Figure 11A:
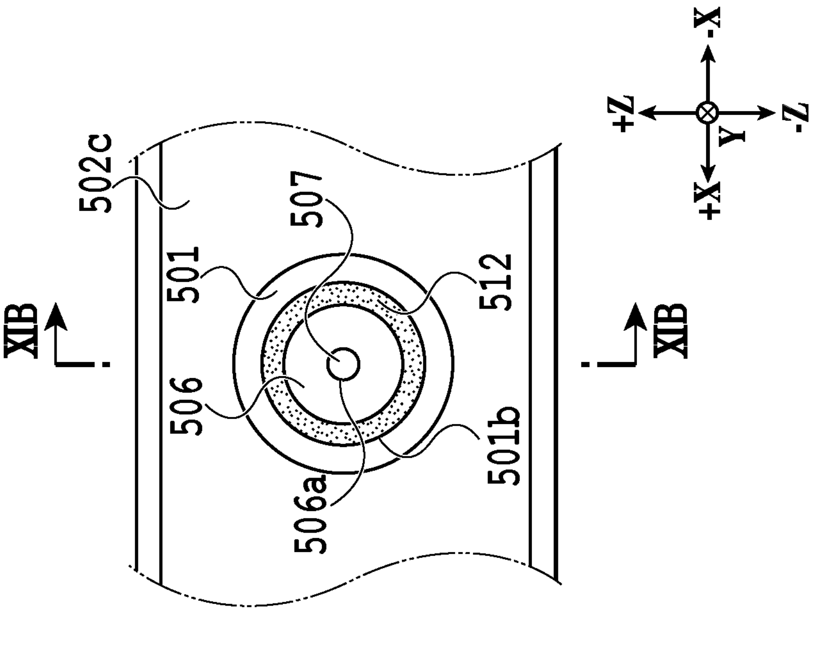

FIGS. 11A and 11B are schematic diagrams showing a liquid holding unit of the present modified example. FIG. 11A is a schematic front view of the supply port 501 of the present modified example. FIG. 11B is a schematic cross-sectional view taken along the XIb-XIb line in FIG. 11A.

As shown in FIG. 11B, the liquid holding unit of the present modified example includes a first region 513 and a second region 512 that is continuously provided from the first region 513 toward a tip end side in the direction of attachment thereof. A first fibrous body is provided in the first region 513 while a second fibrous body is provided in the second region 512. The first fibrous body has a higher density than that of the second fibrous body, and the first region 513 provided with the first fibrous body has a larger capillary force than that of the second region 512 provided with the second fibrous body.

In the present modified example, fineness of the first fibrous body may be set equal to or below 2.5 dtex and fineness of the second fibrous body may be set equal to or above 5.0 dtex. In another example, the number of crimps of the first fibrous body may be set to about 16 crimps per 25 mm, and the number of crimps of the second fibrous body may be set to about 15 crimps per 25 mm. In still another example, a percentage of crimps of the first fibrous body may be set to about 12% and a percentage of crimps of the second fibrous body may be set to about 13%.

In this way, the liquid is held easily on the base end side in the direction of attachment. Accordingly, it is possible to keep the liquid from flowing out to the tip end side.

As described above, the use of the liquid holding members 510 having the different capillary forces makes it possible to configure the liquid holding members 510 provided with the desired capillary forces easily as compared to the case of adjusting the capillary force of the liquid holding member 510 that is formed from a single member as discussed in the first embodiment.

Second Embodiment

In the present embodiment, the constituents that are the same as those in the first embodiment will be denoted by the same reference signs while omitting explanations thereof, and different features from the first embodiment will mainly be discussed. In the present embodiment, the leaking liquid is held in a groove unit provided to the inner peripheral surface of the supply port 501.

Figure 12A:
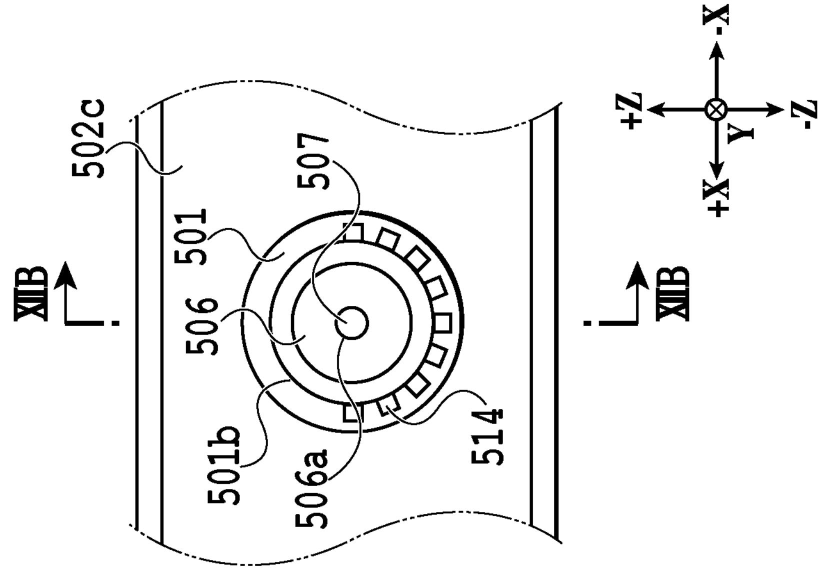
FIG. 12A is a schematic front view and FIG. 12B is a schematic enlarged cross-sectional view showing a liquid holding unit according to another embodiment.
Figure 12B:
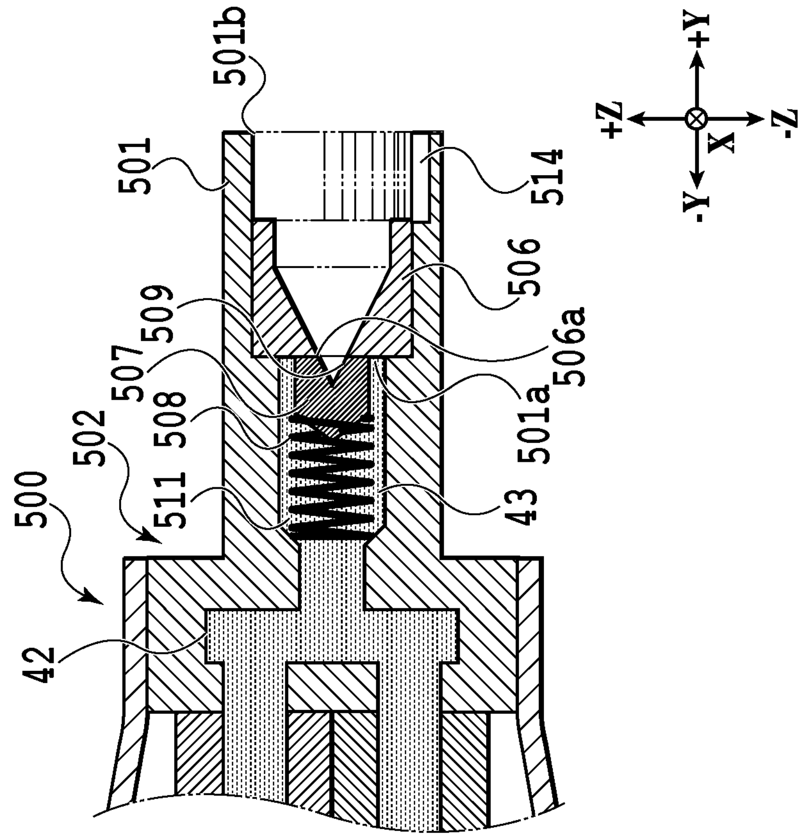

FIGS. 12A and 12B are schematic diagrams showing a liquid holding unit of the present embodiment. FIG. 12A is a schematic front view of the supply port 501 of the present embodiment. FIG. 12B is a schematic cross-sectional view taken along the XIIb-XIIb line in FIG. 12A. As shown in FIG. 12A, the groove unit serving as the liquid holding unit of the present embodiment includes at least one groove 514. As shown in FIG. 12A, it is preferable to form multiple grooves 514 on the gravitational direction side of the inner peripheral surface of the supply port 501. As shown in FIG. 12B, the grooves 514 extends in the direction of attachment in the inner peripheral surface of the second opening 501*b* according to the present embodiment.

Figure 13:
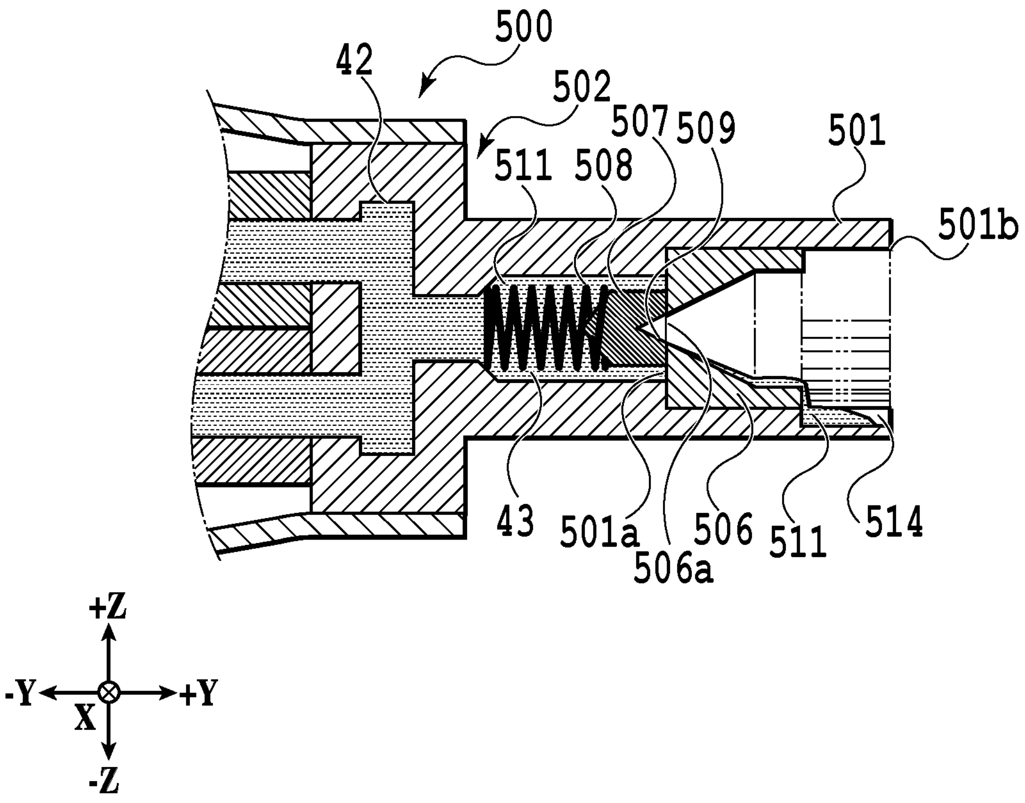
FIG. 13 is a schematic diagram showing an aspect that a liquid is held by a groove unit according to the other embodiment.

FIG. 13 is a schematic diagram showing an aspect that the liquid is held by the groove unit according to the present embodiment. As shown in FIG. 13, the liquid that remains inside the second opening 501*b* can be held by using the capillary force by providing the groove unit including the grooves 514 that bring about a capillary action without providing the liquid holding member 510. In addition, it is possible to reduce costs by curtailing the liquid holding member 510.

As a consequence, according to the liquid container of the present embodiment, it is possible to hold the leaking liquid at high reliability while saving a space, and to suppress contamination due to the liquid leakage as compared to the related art. Moreover, it is possible to reduce the size and the costs of the liquid container.

In addition, adjustment of lengths of the grooves based on estimation of the amount of the leaking liquid makes it possible to suppress a situation where the liquid leaks out.

Modified Example 3

In the present modified example, another groove unit is also provided on the anti-gravitational direction side of the inner peripheral surface of the supply port 501.

Figure 14A:
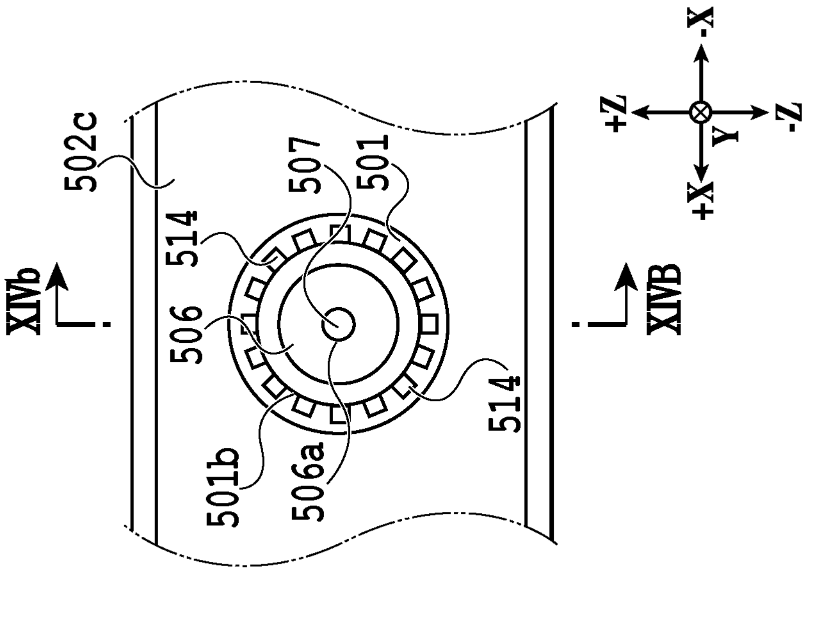
FIG. 14A is a schematic front view and FIG. 14B is a schematic enlarged cross-sectional view showing a liquid holding unit according to still another modified example.
Figure 14B:
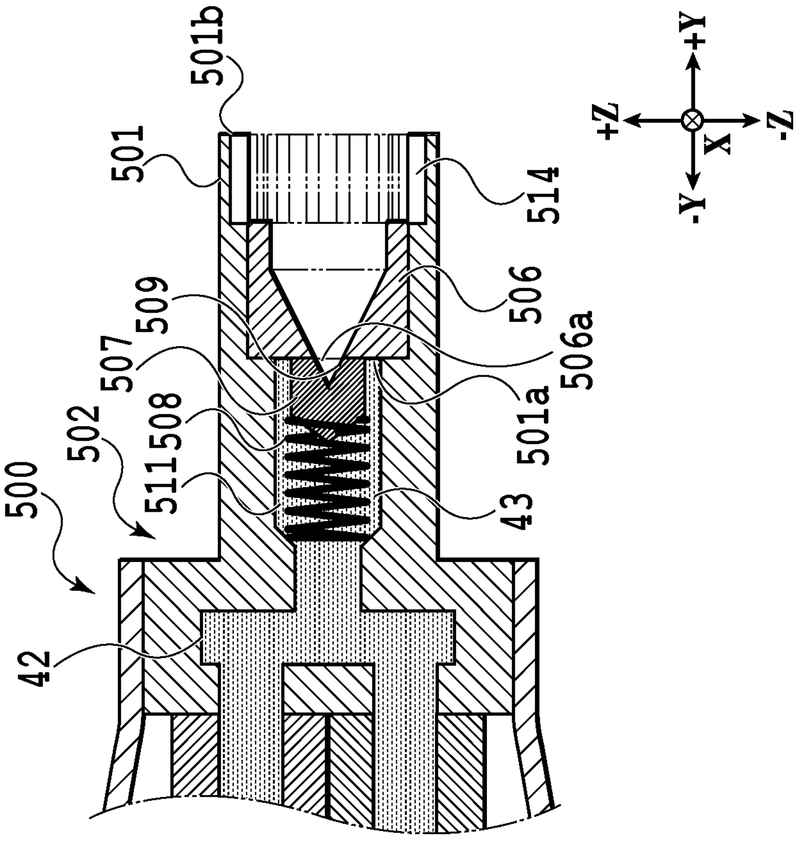

FIGS. 14A and 14B are schematic diagrams showing a liquid holding unit of the present modified example. FIG. 14A is a schematic front view of the supply port 501 of the present modified example. FIG. 14B is a schematic cross-sectional view taken along the XIVb-XIVb line in FIG. 14A. As shown in FIG. 14A, multiple grooves 514 are also formed on the anti-gravitational direction side of the inner peripheral surface of the second opening 501*b* of the supply port 501. As shown in FIG. 14B, the grooves 514 extend in the direction of attachment in the inner peripheral surface of the second opening 501*b* of the supply port 501.

According to the configuration of the present modified example, provision of the groove units on the gravitational direction side and the anti-gravitational direction side makes it possible to hold the liquid even in a case of leakage of the liquid that is more than the estimated amount.

Moreover, since the groove units are present in all the directions in terms of a radial direction of the supply port 501, it is possible to suppress contamination caused by the spatter of the liquid even in a case where the liquid spatters omnidirectionally in the radial direction of the supply port 501. In addition, a difference between two surfaces is eliminated in the case of attaching the liquid container 500, and the usability is therefore improved.

Modified Example 4

Figure 15A:
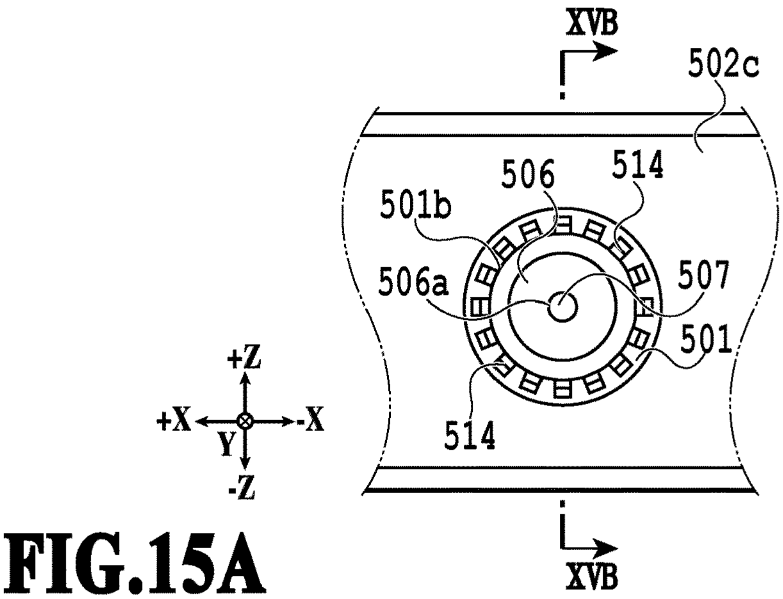
FIG. 15A is a schematic front view and FIG. 15B is a schematic enlarged cross-sectional view showing a liquid holding unit according to yet another modified example.
Figure 15B:
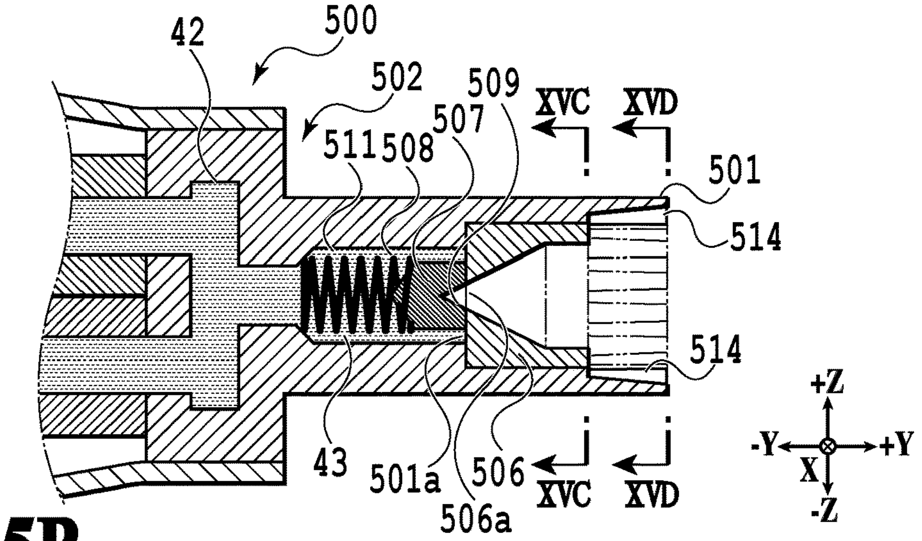
Figure 15C:
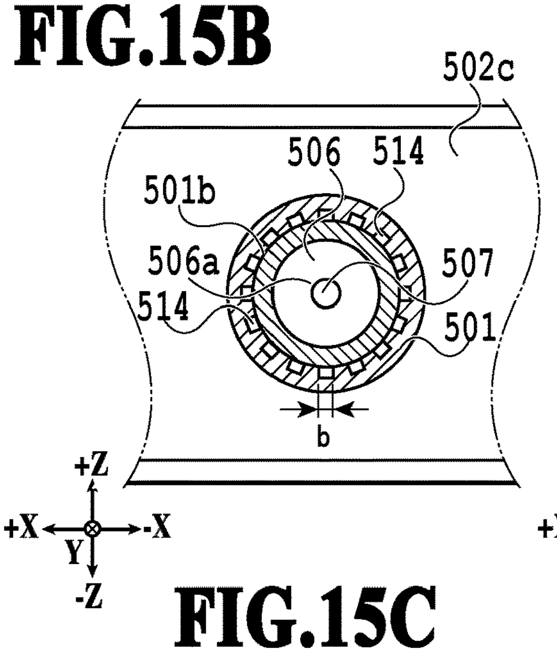
FIGS. 15C and 15D are schematic front views taken at different cross-sectional positions in FIG. 15B.
Figure 15D:
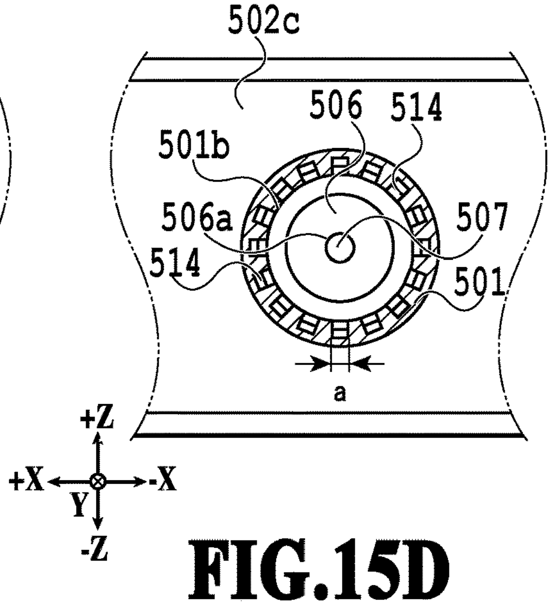

FIGS. 15A to 15D are schematic diagrams showing a liquid holding unit of the present modified example. FIG. 15A is a schematic front view of the supply port 501 of the present modified example. FIG. 15B is a schematic cross-sectional view taken along the XVb-XVb line in FIG. 15A. FIG. 15C is a schematic cross-sectional view taken along the XVc-XVc line in FIG. 15B. FIG. 15D is a schematic cross-sectional view taken along the XVd-XVd line in FIG. 15B.

As shown in FIG. 15B, a width on a tip end side in the direction of attachment of each groove 514 is larger than a width on its base end side in the present modified example. To be more precise, the width of the groove 514 of the present modified example is gradually increased from the base end side to the tip end side in the direction of attachment. Here, the width of the groove 514 on the XVd-XVd line in FIG. 15B is defined as “a” (see FIG. 15D). Meanwhile, the width of the groove 514 on the XVc-XVc line in FIG. 15B is defined as “b” (see FIG. 15C). In this case, a relation “a>b” holds true.

According to the above-described configuration, the capillary force on the base end side in the direction of attachment of the groove unit is larger than the capillary force on its tip end side. For this reason, the groove unit can easily hold the liquid on the base end side in the direction of attachment. As a consequence, it is possible to keep the liquid held by the groove unit from flowing out to the tip end side in the direction of attachment.

Here, it is preferable to form the grooves 514 in the supply port 501 by means of molding with a mold. In the molding, the mold is filled with a material constituting the supply port 501, and then the material is demolded. In this instance, the material is demolded by providing the mold with a draft to facilitate the demolding. The use of the draft makes it possible to shape the form of each groove 514 having the larger capillary force on the base end side in the direction attachment than that on its tip end side.

OTHER EMBODIMENTS

The above-described embodiments can be carried out in combination as desired. For example, the liquid holding member may be provided with the grooves by combining the first embodiment with the second embodiment. Moreover, the liquid holding member provided with the grooves may be disposed only on the gravitational direction side of the inner peripheral surface of the supply unit or on the whole circumference thereof.

According to the liquid container of the present disclosure, it is possible to hold the liquid at high reliability while saving a space, and to suppress contamination due to the liquid leakage. Moreover, it is possible to reduce the size and the costs of the liquid container.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-089493 filed Jun. 1, 2022, and No. 2023-023088 filed Feb. 17, 2023 which are hereby incorporated by reference herein in their entirety.

What is claimed is:

1. A liquid container attachable to a printing apparatus and configured to contain a liquid to be supplied to the printing apparatus, comprising:

a container chamber configured to contain the liquid; and a flow passage unit which is configured to supply the liquid contained in the container chamber to the printing apparatus, wherein the flow passage unit is located on a tip end side of the liquid container in a direction of attachment to the printing apparatus, wherein the flow passage unit includes:

a supply member which has a cylindrical shape and which comprises a first opening formed inside the container chamber and a second opening formed outside the container chamber for supplying the liquid;

a sealing member which has a through hole and is press-fitted between the first opening and the second opening inside the supply member;

a valve body configured to open and close the through hole, wherein the valve body is located between the first opening and the sealing member; and a liquid holding unit disposed on an inner surface of the supply member between the sealing member and the second opening, and further disposed at least on a direction of gravity in a case where the liquid container is attached to the printing apparatus, wherein an extension length of the liquid holding unit in a direction in which the liquid is supplied is larger than a thickness of the liquid holding unit in an inner diameter direction of the second opening.

2. The liquid container according to claim 1, wherein the liquid holding unit is disposed around an entire circumference of the inner surface of the supply member between the sealing member and the second opening.

3. The liquid container according to claim 1, wherein the liquid holding unit includes a fibrous body.

4. The liquid container according to claim 3, wherein an amount of the liquid holdable with the fibrous body is substantially equal to or above 0.015 ml.

5. The liquid container according to claim 3, wherein a volume of the fibrous body is substantially equal to above 24 mm3.

6. The liquid container according to claim 3, wherein the capillary force of the liquid holding unit on a back side in the direction of attaching and detaching of the liquid container is set larger than the capillary force of the liquid holding unit on the tip end side in the direction of attaching and detaching.

7. The liquid container according to claim 3, wherein the liquid holding unit includes a first region provided with a first fibrous body, and a second region provided with a second fibrous body having a fibrous body density different from a fibrous body density of the first fibrous body.

8. The liquid container according to claim 7, wherein the first fibrous body has a higher density than the second fibrous body, and the first fibrous body is provided on a base end side in the direction of attachment relative to the second fibrous body.

9. The liquid container according to claim 7, wherein fineness of the first fibrous body is equal to or below 2.5 dtex, and fineness of the second fibrous body is equal to or above 5.0 dtex.

10. The liquid container according to claim 7, wherein number of crimps of the first fibrous body is substantially equal to 16 crimps per 25 mm, and number of crimps of the second fibrous body is substantially equal to 15 crimps per 25 mm.

11. The liquid container according to claim 7, wherein a percentage of crimps of the first fibrous body is substantially equal to 12%, and a percentage of crimps of the second fibrous body is substantially equal to 13%.

12. The liquid container according to claim 1, wherein the liquid holding unit includes at least one groove extending between the sealing member and the second opening in the supply member.

13. The liquid container according to claim 12, wherein an amount of the liquid holdable with the groove unit is substantially equal to or above 0.015 ml.

14. The liquid container according to claim 12, wherein a width of the groove on a tip end side in the direction of attachment is different from a width of the groove on a base end side in the direction of attachment, and the width on the tip end side is larger than the width on the base end side.

15. A printing apparatus comprising:

an attachment unit for attaching a liquid container;

a liquid supply tube equipped with the attachment unit; and a printing unit configured to perform printing by using a liquid supplied from the liquid supply tube, wherein the liquid container comprises:

a container chamber configured to contain the liquid; and a flow passage unit which is configured to supply the liquid contained in the container chamber to the printing apparatus, wherein the flow passage unit is located on a tip end side of the liquid container in a direction of attachment to the printing apparatus, wherein the flow passage unit include a supply member which has a cylindrical shape and which comprises a first opening formed inside the container chamber and a second opening formed outside the container chamber for supplying the liquid;

a sealing member which has a through hole and is press-fitted between the first opening and the second opening inside the supply member;

a valve body configured to open and close the through hole, wherein the valve body is located between the first opening and the sealing member; and a liquid holding unit disposed on an inner surface of the supply member between the sealing member and the second opening, and further disposed at least on a lower side in a direction of gravity in a case where the liquid container is attached to the printing apparatus, wherein an extension length of the liquid holding unit in a direction in which the liquid is supplied is larger than a thickness of the liquid holding unit in an inner diameter direction of the second opening, and wherein in a state where the liquid container is attached to the attachment unit, the liquid holding unit and the liquid supply tube do not contact each other.

16. A liquid container attachable to a printing apparatus and configured to contain a liquid to be supplied to the printing apparatus, comprising:

a container chamber configured to contain the liquid; and a flow passage unit which is configured to supply the liquid contained in the container chamber to the printing apparatus, wherein the flow passage unit is located on a tip end side of the liquid container in the direction of attachment to the printing apparatus, wherein the flow passage unit includes:

a supply member which has a cylindrical shape and which comprises a first opening formed inside the container chamber and a second opening formed outside the container chamber for supplying the liquid;

a sealing member which has a through hole and is press-fitted between the first opening and the second opening inside the supply member a valve body configured to open and close the through hole, wherein the valve body is located between the first opening and the sealing member; and a liquid holding unit disposed on an inner surface of the supply member between the sealing member and the second opening, and further disposed at least on a lower side in a direction of gravity in a case where the liquid container is attached to the printing apparatus, wherein a capillary force in a from the second opening to the sealing member is greater than a capillary force in a direction of a thickness of the liquid holding unit.

17. The liquid container according to claim 16, wherein the liquid holding unit is formed from an absorber, and the capillary force of the absorber on a back side in the direction of attaching and detaching of the liquid container is set larger than the capillary force of the absorber on the tip end side in the direction of attaching and detaching.

18. The liquid container according to claim 16, wherein the liquid holding unit is formed from a groove, and the capillary force of the groove on a back side in the direction of attaching and detaching of the liquid container is set larger than the capillary force of the groove on the tip end side in the direction of attaching and detaching.

19. The liquid container according to claim 16, wherein the liquid holding unit is formed from an absorber and a groove, and the capillary force of the liquid holding unit on a back side in the direction of attaching and detaching of the liquid container is set larger than the capillary force of the liquid holding unit on the tip end side in the direction of attaching and detaching.

* * * * *